US007132169B2

(12) United States Patent
Lee et al.

(10) Patent No.: US 7,132,169 B2
(45) Date of Patent: Nov. 7, 2006

(54) COMPOSITION FOR FORMING COATING LAYER AND FLAT MONITOR PANEL FOR DISPLAY DEVICE HAVING COATING LAYER PREPARED FROM THE SAME

(75) Inventors: Ji-Won Lee, Suwon (KR); Yoon-Ho Jun, Suwon (KR); Jae-Man Choi, Seoul (KR); Sang-Min Lee, Suwon (KR)

(73) Assignee: Samsung SDI Co., Inc., Suwon-Si (KR)

( * ) Notice: Subject to any disclaimer, the term of this patent is extended or adjusted under 35 U.S.C. 154(b) by 557 days.

(21) Appl. No.: 10/238,743

(22) Filed: Sep. 9, 2002

(65) Prior Publication Data

US 2003/0048067 A1 Mar. 13, 2003

(30) Foreign Application Priority Data

Sep. 10, 2001 (KR) .............................. 2001-55584
Sep. 10, 2001 (KR) .............................. 2001-55585

(51) Int. Cl.
*B32B 9/04* (2006.01)

(52) U.S. Cl. ................. 428/447; 428/448; 106/287.15; 106/287.16; 313/461; 313/479; 252/518.1; 252/521.3

(58) Field of Classification Search ................ 428/447, 428/448; 252/518.1, 521.3; 313/461, 479; 106/287.15, 287.16
See application file for complete search history.

(56) References Cited

U.S. PATENT DOCUMENTS

| | | | | |
|---|---|---|---|---|
| 5,523,114 | A * | 6/1996 | Tong et al. | 427/68 |
| 5,587,835 | A * | 12/1996 | Shimizu et al. | 359/589 |
| 6,129,980 | A * | 10/2000 | Tsukada et al. | 428/327 |
| 6,400,492 | B1 * | 6/2002 | Morita et al. | 359/296 |
| 6,639,346 | B1 * | 10/2003 | Bae et al. | 313/461 |
| 6,642,647 | B1 * | 11/2003 | Taniguchi et al. | 313/477 R |
| 6,737,145 | B1 * | 5/2004 | Watanabe et al. | 428/64.4 |
| 6,771,017 | B1 * | 8/2004 | Nishizawa et al. | 313/479 |

FOREIGN PATENT DOCUMENTS

| | | |
|---|---|---|
| KR | 1999-011487 | 2/1999 |
| KR | 2000-0050674 | 8/2000 |

OTHER PUBLICATIONS

Korean Patent Laid-Open Publication No. 1999-011487, Published on Feb. 18, 1999, in the name of Park, et al.

Korean Patent Abstract, Publication No. 1020000050674, Published on Aug. 5, 2000, in the name of Par, et al.

* cited by examiner

*Primary Examiner*—Margaret G. Moore
(74) *Attorney, Agent, or Firm*—Christie, Parker & Hale, LLP

(57) ABSTRACT

Disclosed is a composition for forming a coating layer, and a flat monitor panel for a display device comprising the coating layer. The composition for forming the coating layer comprises a metallic oxide particulate, a coloring agent, and a silane coupling agent. The metallic oxide particulate is at least one metallic oxide selected from the group consisting of indium tin oxide (ITO), antimony tin oxide (ATO), aluminum zinc oxide (AZO), $SnO_2$, $In_2O_3$, and $Sb_2O_3$. The coloring agent includes an organic or an inorganic pigment, or a metal complex.

18 Claims, 1 Drawing Sheet

COMPOSITION FOR FORMING COATING LAYER AND FLAT MONITOR PANEL FOR DISPLAY DEVICE HAVING COATING LAYER PREPARED FROM THE SAME

CROSS REFERENCE TO RELATED APPLICATION

This application claims priorities of Korea Patent Application Nos. 2001-55584 and 55585 filed on Sep. 10, 2001 in the Korean Intellectual Property Office, the disclosures of which are incorporated herein by reference.

BACKGROUND OF THE INVENTION (a) Field of the Invention

The present invention relates to a composition for forming a coating layer and a display device having a coating layer prepared from the same, and particularly, to a composition for forming a coating layer capable of controlling light transmittance and body color, improving mechanical strength and contrast, and providing good antistatic and electromagnetic shielding properties, and a display device having a coating layer prepared from the same.

(b) Description of the Related Art

A display device such as a Cathode Ray Tube (CRT) has a curved panel having a predetermined curvature, which causes the display device to sparkle and be image-distorted on the periphery thereof. Therefore, development of a high quality screen on a curved panel field is limited. In order to alleviate these problems, a flat panel display has been proposed and developed.

The cathode ray tube is a device for displaying images on a screen by emitting electron beams from an electron gun assembly and landing them on red (R), blue (B), or green (G) phosphors coated on the screen through a black matrix with a dot or a stripe shape. FIG. 1 shows a cross-sectional view of the cathode ray tube. The panel 10 of the cathode ray tube is composed of a face panel 12 and a curved lateral wall 14 that extends from the periphery of the face panel 12 toward a funnel 20, and is joined to the funnel 20. The funnel 20 includes a neck 24 which is formed on an end of the funnel 20 opposite the end joined to the panel 12, and an electron gun 22 is disposed in the neck 24 of the funnel 20.

The outer surface of the cathode ray tube 10 is coated with a layer 16 having various functions depending upon the type of panel. Examples of the layer include, but are not limited to, a high contrast layer for decreasing light transmittance, an anti-reflection layer for reducing reflectivity, and an antistatic layer for preventing electrostatics and preventing dust from being attracted to the panel. Recently, as concerns that electromagnetic waves exert a harmful influence upon the human body have increased, electromagnetic waves have been strictly restricted by regulations. Therefore, development of a coating layer for shielding electromagnetic waves and the magnetic field that occurs from the display device have been actively pursued. The material and structure of the layer can be determined by considering conductivity, light transmittance, reflectivity, and so on.

In order to provide a display device with antistatic, anti-reflective, and electromagnetic wave shielding properties, a transparent conductive layer is generally applied on the surface of a panel by coating the surface with a coating liquid containing conductive particulates. The transparent conductive layer is a thin coating layer formed on a glass or a plastic substrate having a high light transmittance.

Generally, it is prepared by wet-coating the substrate surface with a composition comprising transparent conductive particles such as a metallic oxide, for example, a tin oxide doped with antimony (Sb) or an indium oxide doped with tin (Sn), and then calcinating it at a low temperature. The wet-coating process includes spin coating, spray coating, or dip coating techniques.

The transparent conductive layer prepared with the above method has a surface resistance of about $10^7$ Ω/□, which is in excess of the surface resistance range of between $10^2$ Ω/□ and $10^4$ Ω/□, and which is required for shielding the electromagnetic waves. In order to decrease the surface resistance to the desired range, the thickness of the conductive layer needs to be increased, a thicker conductive layer degenerates the reflection-reducing effects of the layer. Therefore, it is difficult to provide a transparent conductive layer having low surface resistance as well as good electromagnetic wave shielding and anti-reflection properties by just coating the panel with the tin oxide doped with antimony (Sb) or the indium oxide doped with tin (Sn). Specifically, since a flat monitor is applied with a high level of voltage and has a transparent panel, it is further necessary to provide a transparent conductive layer having a high conductivity and a low light transmittance to meet the regulations on electromagnetic waves set by TCO standard. The TCO standard is a standard conforming to measurement standard MPR-II for a VDU (Visual Display Unit) which is set by SWEDAC (Swedish board for technical accreditation).

One approach to satisfy these requirements is Korean Patent Laid-open Publication No. 2000-50674, which discloses a method for forming a conductive thin layer comprising the step of coating a substrate with a metal colloid dispersed with a single type of metal particle such as Au, Ag, Pd, Ru, Rh, and Pt, or an alloy thereof, in a solvent. Korean Patent Laid-open Publication No. 1999-11487 discloses an antistatic mono-layer prepared by using a composition comprising a metal particulate, a binder, and a solvent. In this method, the surface of the metal particulate is treated with a binder such as polyvinyl alcohol, polyvinyl pyrrolidone, or an oligomer of silicon alkoxide to improve the dispersing state of metal particulates.

It is, however, difficult to save manufacturing costs due to the expense of the metal used for the conductive oxide particulate. Further, since the colloid has a poor coating property and low stability, the coating layer prepared from the colloid tends to be stained and be susceptible to problems in the process so that productivity is decreased compared to the conventional oxide particulate. In spite of the above-mentioned problems, metal colloids are applied as a coating layer to the outer surface of monitors to satisfy the regulations on the electromagnetic waves set by the TCO standard, and accordingly, a need exists for a composition for forming a coating layer suitable for applying to a flat monitor panel.

SUMMARY OF THE INVENTION

In one embodiment, the invention is directed to a composition for forming a coating layer on the outer surface of a flat monitor panel comprising a metallic oxide particulate, a coloring agent, and a silane coupling agent.

The present invention further provides a display device comprising a coating layer formed by coating the outer surface of a flat monitor panel with the composition for forming the coating layer.

The present invention further provides a display device comprising a first coating layer formed by coating the outer surface of a flat monitor panel with said composition for forming the coating layer; and a second coating layer (anti-reflection layer) formed by coating said first coating layer with a composition comprising a metallic alkoxide or an oligomer thereof.

The present invention further provides a display device comprising a first coating layer formed by coating the outer surface of a flat monitor panel with said composition for forming the coating layer; a second coating layer (anti-reflection layer) formed by coating the first coating layer with a composition comprising a metallic alkoxide or an oligomer thereof; and a third coating layer (non-glare layer) formed by spray-coating said second coating layer (anti-reflection layer) with a hydrolysate comprising a metallic alkoxide or an oligomer thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
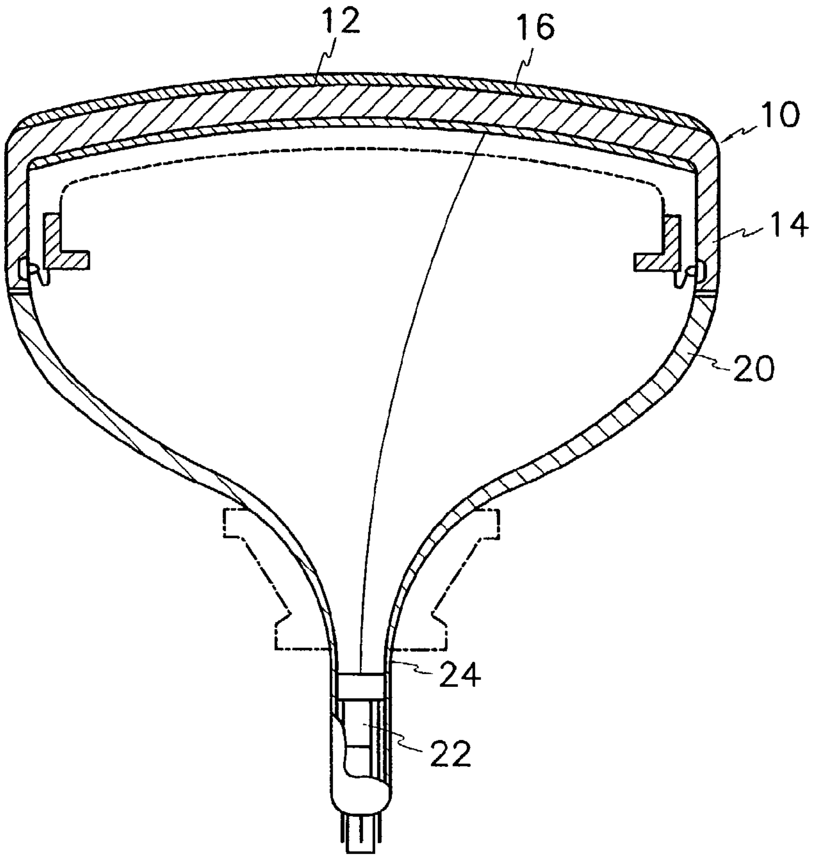
FIG. 1 is a cross-sectional view showing a cathode ray tube with a coating layer on the outer surface of a panel.

Hereinafter, a preferred embodiment of this invention will be described in detail.

The present invention relates to a composition for forming a coating layer on the outer surface of a flat monitor panel comprising a metallic oxide particulate, a coloring agent, and a silane coupling agent.

The metallic oxide particulate preferably includes at least one oxide selected from the group consisting of indium tin oxide (ITO), antimony tin oxide (ATO), aluminum zinc oxide (AZO), $SnO_2$, $In_2O_3$, and $Sb_2O_3$. The mentioned conductive metallic oxide particulates have good coating properties and processability and are available at a low price. The conductive oxide particulate is preferably included in an amount ranging from 0.5 to 6% based on the solid content of the composition for forming the coating layer. If the content of conductive oxide particulate is less than 0.5%, the conductibility is insufficient; whereas if the content is in excess of 6%, the coating property is degenerated, the reflectivity is increased, and the manufacturing cost is increased.

The coloring agent may include an organic or inorganic pigment, or a metal complex. The organic pigment may include a carbonaceous material such as carbon black or graphite, or yellow-, blue-, or violet-based pigment. The inorganic pigment may include titan black (TiO), TiN, $TiO_{1-x}N_x$ ($0<x<1$), TiC, TiN—TiC, cobalt oxide, zinc oxide, ferric oxide, ruthenium oxide, aluminum oxide, or a mixture thereof. The metal complex may include metal complex azo dyes, metal complex anthraquinone dyes, and the like. Preferably, it is carbon black or titan black, and it is most preferably titan black, considering its high color purity.

The coloring agent facilitates controlling the light transmittance and body color (color coordination). The content of the coloring agent is varied depending upon the desired light transmittance of the conductive layer. It is preferred that the content of the coloring agent ranges from 0.01 to 10% based on the solid content of the composition of the present invention. If the content of the coloring agent is less than 0.01%, the color insufficiently appears, whereas if the content is in excess of 10%, the light transmittance is decreased so that the resolution degenerates.

The silane coupling agent is preferably represented by the following Formula (1):

$$YRSiX_3 \quad (1)$$

wherein

Y is an organic functional group selected from the group consisting of vinyl, phenyl, epoxy, amino, and mercapto groups, and is compatible (or reactive) with an organic material;

R is an alkyl group, preferably a $C_{1-4}$ alkyl group; and

X is a $C_{1-4}$ alkoxy group that is compatible (or reactive) with an inorganic material, and is preferably a methoxy or ethoxy group.

Examples of the silane coupling agent represented by Formula (1) include, but are not limited to, epoxy silane, trimethoxy silane, phenyltrimethoxy silane, vinyl silane, and the like.

Generally, when the organic or inorganic pigment is used as the coloring agent, it is difficult to obtain a conductive layer in which the constituents are uniformly dispersed since the organic or inorganic pigment is not very compatible with the conductive oxide particulate. According to the present invention, the silane coupling agent is added to improve the compatibility between the conductive oxide particulate and the coloring agent (particularly the organic or inorganic pigment). That is, since the silane coupling agent has an organic functional group such as a vinyl, phenyl, epoxy, amino, or mercapto group that is compatible with the organic and the inorganic pigments, the silane coupling agent can improve the compatibility of the organic or the inorganic pigment and the coloring agent, so it is thereby possible to provide a conductive layer in which the coloring agent and the conductive particulate are uniformly dispersed. Further, since the silane coupling agent has an alkoxy group that is compatible with an inorganic material, it can further improve adherence to the panel substrate so that the mechanical strength of the conductive layer is enhanced.

The silane coupling agent is preferably included in the composition for forming a conductive layer in an amount ranging from 0.01 to 10% based on the solid content of the composition. If the content of the silane coupling agent is less than 0.01%, the resulting effect is insufficient, whereas if the content is in excess of 10%, the conductivity degenerates. In addition, the silane coupling agent is preferably used in an amount of approximately 10% based on the solid content of the inorganic constitutes present in the composition. The content of the silane coupling agent may be varied depending upon the kind of silane coupling agent and the properties of the inorganic material.

According to the present invention, the composition for forming a coating layer is prepared by adding a conductive oxide particulate to an organic solvent and dispersing them, and adding a coloring agent and a silane coupling agent thereto. The organic solvent may be an alcohol-based solvent such as methanol, ethanol, n-butanol, isopropanol, diacetone alcohol, and the like, or it may also include at least one solvent selected from the group consisting of methyl cellosolve, ethyl cellosolve, isopropyl cellosolve, and dimethyl formamide. The composition may be applied to the outer surface of a flat monitor panel using a conventional coating method such as spin coating, spray coating, or dip coating, and then dried and calcinated to provide a coating layer.

The composition for a coating layer according to the present invention may be applied as either a mono-layered thin film on the outer surface of a flat monitor panel or a multi-layered film in which a coating layer of silica is coated thereon. Alternatively, the multi-layered film is provided by applying a first coating layer including a metallic oxide conductive particulate such as ITO, and then applying a second coating layer of the composition of the present invention over the first coating layer.

Figure 2:
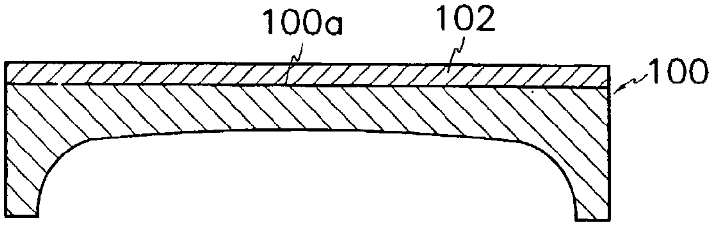
FIG. 2 is a cross-sectional view showing a panel with a coating layer according to the present invention.

According to a first preferred embodiment of the present invention, as shown in FIG. 2, a panel for a display device 100 is applied with a mono-layered coating layer 102 formed by coating the outer surface 100*a* of the flat monitor panel 100 with the composition for a coating layer according to the present invention.

According to a second preferred embodiment of the present invention, a panel for a display device is applied with a two-layered coating layer comprising a first coating layer formed by coating the outer surface of a flat monitor panel with the composition for a coating layer according to the present invention; and a second coating layer (an anti-reflection layer) formed by coating the first coating layer with a composition including a metallic alkoxide or an oligomer thereof.

According to a third preferred embodiment of the present invention, a panel for a display device is applied with a three-layered coating layer comprising a first coating layer formed by coating the outer surface of a flat monitor panel with the composition for a coating layer according to the present invention; a second coating layer (an anti-reflection layer) formed by coating the first coating layer with a composition including a metallic alkoxide or an oligomer thereof; and a third coating layer (a non-glare layer) formed by spray-coating the second coating layer (the anti-reflection layer) with a hydrolysate including a metallic alkoxide or an oligomer thereof.

The second coating layer is prepared by adding a metallic alkoxide or an oligomer thereof to water, an organic solvent, or a mixture thereof, and spin-coating or dip-coating the first coating layer with the resultant solution. The organic solvent may be an alcohol-based solvent such as methanol, ethanol, n-butanol, isopropanol, diacetone alcohol, and the like, or it may include at least one solvent selected from the group consisting of methyl cellosolve, ethyl cellosolve, isopropyl cellosolve, and dimethyl formamide.

The metallic alkoxide included in both the second coating layer (the anti-reflection layer) or the third coating layer (the non-glare layer) preferably is represented by the following Formula (2):

$$M(OR')_4 \qquad (2)$$

wherein

M is an element selected from the group consisting of Si, Ti, Sn, and Zr; and

R' is a $C_{1-4}$ alkyl group.

Preferably, the metallic alkoxide has a degree of polymerization ranging from 2 to 10. If the degree of polymerization is in excess of 10, it is difficult to apply due to an excessively high viscosity.

The metallic alkoxide preferably includes a silicon alkoxide or an oligomer thereof, and a fluoro silicate. Examples of the fluoro silicate include, but are not limited to, $CF_3(CF_2)_7CH_2CH_2Si(OCH_3)_3$, $CF_3(CF_2)_5CH_2CH_2Si(OCH_3)_3$, $CF_3(CF_2)_7CH_2CH_2Si(OCH_3)_2$, $CF_3CH_2CH_2Si(CH_3)_3$, $CF_3(CF_2)_5CH_2CH_2SiCl_3$, $CF_3(CF_2)_7CH_2CH_2SiCl_3$, $CF_3(CF_2)_7CH_2CH_2SiMeCl_3$, $CF_3CH_2CH_2SiCl_3$, and on the like.

The second coating layer further comprises a coloring agent and a silane coupling agent in addition to the metallic alkoxide or the oligomer thereof. The coloring agent and the silane coupling agent in the second coating layer are identical to those for the composition for forming a coating layer of the present invention.

In this case, the composition for forming the second coating layer comprises a metallic alkoxide or an oligomer thereof, a coloring agent, a silane coupling agent, and a solvent. The content of the metallic alkoxide or oligomer thereof preferably ranging from 0.01 to 10% based on the total solid content of the composition for forming the second coating layer. When the content of metallic alkoxide or oligomer thereof is less than 0.01%, the durability of the coating layer degenerates, whereas when the content is more than 10%, the coating property degenerates to a point where cracks are generated on the layer due to the excessively high viscosity.

The content of the coloring agent is controlled considering the desired light transmittance of the coating layer. The content preferably ranges from 0.01 to 5% based on the total solid content of the composition for forming the second coating layer. When the content of the coloring agent is less than 0.01%, the light transmittance is too high so that the resolution degenerates, and when the content is more than 5%, the resolution also degenerates due to low light transmittance.

The amount of silane coupling agent preferably ranges from 0.01 to 70% based on the total solid content of the metallic alkoxide. The amount is adjusted considering the kind of silane coupling agent and the properties of the inorganic material. When the amount of silane coupling agent is less than 0.01%, the obtained effect is insufficient, and when the content is more than 70%, it is difficult to control the reflectivity and the durability.

Alternatively, the second coating layer may be prepared by coating the composition for forming a coating layer of the present invention on the first coating layer including a conductive particulate. That is, according to a fourth preferred embodiment of the present invention, a panel for a display device is applied with a two-layered coating layer comprising a first coating layer formed by coating the outer surface of a flat monitor panel with a composition including a conductive particulate, and a second coating layer formed by coating the first coating layer with the composition for forming a coating layer according to the present invention.

According to a fifth preferred embodiment of the present invention, a panel for a display device is applied with a three-layered coating layer comprising a first coating layer formed by coating the outer surface of a flat monitor panel with a composition including a conductive particulate; a second coating layer formed by coating the first coating layer with the composition for a coating layer according to the present invention; and a third coating layer (non-glare layer) formed by spray-coating the second coating layer with a hydrolysate including a metallic alkoxide or an oligomer thereof.

The conductive particulate used in the third and fourth embodiments may include a metallic oxide such as tin oxide, titanium oxide, zinc oxide, tungsten oxide, molybdenum oxide, vanadium oxide, indium oxide, antimony oxide, indium titanium oxide, indium tin oxide (ITO), antimony tin oxide (ATO), or the like. The metal alkoxide or the oligomer thereof can be the same as those used in the first and second embodiments.

The following examples illustrate the present invention in further detail. However, it is understood that the present invention is not limited by these examples.

EXAMPLE 1

30 g of a dispersion of ITO particulates (10% solid content) having a high conductivity were added to 70 g of a mixed organic solvent of 10 g of methanol, 30 g of ethanol, 15 g of isopropyl alcohol, and 15 g of methyl cellosolve. 2 g of a coloring agent of a carbon black dispersion (10% solid content) and 0.3 g of a silane coupling agent of phenyl trimethoxy silane (PTMS) were added to provide a composition for forming a coating layer. The composition was spin-coated on a transparent flat glass panel, and then dried and calcinated at a temperature of 200° C. to obtain a coating layer.

EXAMPLE 2

A coating layer was prepared by the same method as in Example 1, except that ATO was used instead of ITO particulates.

EXAMPLE 3

The composition for forming a coating layer obtained in Example 1 was spin-coated on a transparent flat glass panel, and then dried and calcinated at a temperature of 200° C. to provide a first coating layer.

36 g of tetraethyl orthosilicate, 34 g of ethanol, and 20 g of pure water were mixed, and 0.5 g of nitric acid was added. The mixture was reacted at room temperature for 24 hours to provide a silica sol. 10 g of the resultant silica sol, 30 g of methanol, 50 g of ethanol, and 10 g of n-butanol were mixed to provide a composition for forming a second coating layer. The composition was spin-coated on the first coating layer and then heat-treated at 200° C. for 30 minutes to provide a second coating layer. Thereby, a two-layered coating layer was obtained.

EXAMPLE 4

A two-layered coating layer was prepared by the same method as in Example 3 except that in addition to tetraethyl orthosilicate, a coloring agent and a silane coupling agent were further added to the composition obtained in Example 3 for forming a second coating layer.

The composition for forming a second coating layer obtained from Example 4 was prepared as described below. Carbon black having an average particle diameter of less than 200 nm was dispersed in water to provide a carbon black dispersion. 10 g of the obtained carbon black dispersion and 0.1 g of a coupling agent of phenyl trimethoxy silane (PTMS) were mixed, then further mixed with 36 g of tetraethyl orthosilicate (TEOS), 34 g of ethanol, and 20 g of pure water, then 0.5 g of nitric acid was added. The resultant mixture was subjected to reaction at room temperature for 24 hours to provide a carbon-silica mixed sol (10% solid content). To 10 g of the obtained carbon-silica mixed sol, 30 g of methanol, 50 g of ethanol, and 10 g of n-butanol were added and mixed to prepare a composition for forming a second coating layer.

EXAMPLE 5

30 g of a dispersion of conductive indium tin oxide (ITO) particulates (10% solid content) were dispersed in 70 g of a mixed organic solvent of 10 g of methanol, 30 g of ethanol, 15 g of isopropyl alcohol, and 15 g of methyl cellosolve to prepare a first coating composition. The resultant composition was coated on a flat glass panel to provide a first coating layer.

A coating composition having the same formulation as the composition for forming a coating layer of Example 1, except the amount of the dispersion of ITO particulates (10% solid content) was 10 g, was spin-coated on the first coating layer and then dried and calcinated at a temperature of 200° C. to provide a second coating layer.

COMPARATIVE EXAMPLE 1

A coating layer was prepared by the same method as in Example 1, except that the silane coupling agent was excluded.

COMPARATIVE EXAMPLE 2

10 g of Au/Ru metallic colloids (3% solid content) were added to a mixed organic solvent including 30 g of methanol, 30 g of ethanol, 20 g of isopropyl alcohol, 10 g of diacetylacetone, 5 g of N-methyl-pyrrolidone and 15 g of methyl cellosolve to prepare a coating composition. Using the coating composition, a coating layer was prepared by the same method as in Example 1.

Light transmittance, and electromagnetic shielding properties at a very low frequency of between 2 kHz and 400 kHz of the coating layers according to Examples 1 and 2 and Comparative Example 1 were measured, and the results are listed in Table 1.

TABLE 1

| | Light transmittance (%) | Electromagnetic shielding property (V/m) | The regulation on the electromagnetic shielding property |
|---|---|---|---|
| Ex. 1 | 65 | Below 0.85 | allowable range of the TCO standard (below 1 V/m) |
| Ex. 2 | 65 | 1.3 | allowable range of the MPR-II standard (below 2.5 V/m) |
| Comp. Ex. 1 | 65 | Below 0.85 | allowable range of the TCO standard (below 1 V/m) |

As shown in Table 1, the electromagnetic shielding property of the coating layer according to the present invention at the very low frequency is below 1 V/m when the electromagnetic waves are measured 30 cm from a monitor, which is set by the TCO regulations. It is also below 2.5 V/m when the electromagnetic wave is measured 50 cm from a monitor, which is set by the Measure and Proof Radiation Board (MPR-II), a standard established in Sweden. Therefore, the coating layer according to the present invention meets the standards set by both the TCO and MPR-II, so that it is accepted as having a good electromagnetic shield degree.

Strength, hardness, and surface roughness of coating layers according to Examples 1 and 2 and Comparative Example 1 were measured, and the results are listed in Table 2. An eraser test was carried out by repeated rubbing within a 10 cm range on the coating layer with a 1 kg load 100 times at a constant velocity, and then the surface state was evaluated by the naked eye. The eraser test carried out used standardized goods. The surface roughness was measured by using an Industrial Atomic Force Microscope.

TABLE 2

| | Strength of layer (eraser test) | Hardness of layer (pencil hardness) | Surface roughness | Average height (Å) |
|---|---|---|---|---|
| Ex. 1 | No scar occurring at 100 strokes | 8 H | 74.7 | 279 |
| Comp. Ex. 1 | Scar occurring at 50 strokes | 7 H | 120 | 450 |

It is verified that the coating layer according to the present invention has good mechanical strength, such as layer strength and layer hardness.

Furthermore, the coating layers formed according to the Examples and Comparative Examples were evaluated for defects such as stains, scratch lines and spots, and rated on a five-point scale with a rating of "5" for the best quality and a rating of "1 " for the worst quality. The results are shown in Table 3.

TABLE 3

| Defect | Ex. 5 | Comp. Ex. 2 |
|---|---|---|
| Stains | 5 | 3 |
| Scatch lines | 4 | 4 |
| Spots | 4 | 2 |

Note:
5: very good, 4: good, 3: normal, 2: poor, and 1: very poor

The present invention can advantageously provide low manufacturing cost and high productivity, and provide a coating layer having a good surface state by applying a metallic oxide particulate instead of a metal colloid. Further, the light transmittance and the body color are easily controlled by using a coloring agent. The silane coupling agent is added as a coupling agent to thereby obtain a uniform dispersion of the coloring agent and the conductive oxide particulate, and to improve the mechanical strength.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A composition for forming a coating layer on the outer surface of a flat monitor panel, comprising:

a metallic oxide particulate selected from the group consisting of indium tin oxide (ITO), antimony tin oxide (ATO), aluminum zinc oxide (AZO), $SnO_2$, $In_2O_3$, and $Sb_2O_3$;

a coloring agent; and a silane coupling agent represented by the following Formula (1):

$$YRSiX_3 \quad (1)$$

wherein

Y is an organic functional group selected from the group consisting of a vinyl groups, phenyl groups, and mercapto groups, and is reactive with an organic material;

R is an alkyl group; and

X is an alkoxy group that is reactive with an inorganic material.

2. The composition according to claim 1, wherein the content of the metallic oxide particulate is between 0.5 and 6% based on the solid content of the composition, and the content of the silane coupling agent is between 0.01 and 10% based on the solid content of the composition.

3. The composition according to claim 1, wherein the coloring agent is selected from the group consisting of an organic or an inorganic pigment, and a metal complex.

4. The composition according to claim 3, wherein the coloring agent is at least one selected from the group consisting of carbon black, graphite, titan black (TiG), TiN, $TiO_{1-x}N_x$ $(0<x<1)$, TiC, TiN-TiC, cobalt oxide, zinc oxide, ferric oxide, ruthenium oxide, aluminum oxide, metal complex azo dyes, metal complex anthraquinone dyes, and a mixture thereof.

5. A composition for forming a coating layer on the outer surface of a flat monitor panel, comprising:

a metallic oxide particulate selected from the group consisting of indium tin oxide (ITO), antimony tin oxide (ATO), aluminum zinc oxide (AZO), $SnO_2$, $In_2O_3$, and $Sb_2O_3$;

titan black; and a silane coupling agent represented by the following Formula (1):

$$YRSiX_3 \quad (1)$$

wherein

Y is an organic functional group selected from the group consisting of a vinyl groups, phenyl groups, and mercapto groups, and is reactive with an organic material;

R is an alkyl group; and

X is an alkoxy group that is reactive with an inorganic material.

6. A flat monitor panel for a display device comprising a coating layer formed by coating the outer surface of a flat monitor panel with a composition for forming a coating layer, comprising:

a metallic oxide particulate;

a coloring agent; and a silane coupling agent represented by the following Formula (1):

$$YRSiX_3 \quad (1)$$

wherein

Y is an organic functional group selected from the group consisting of a vinyl groups, phenyl groups, and mercapto groups, and is reactive with an organic material;

R is an alkyl group; and

X is an alkoxy group that is reactive with an inorganic material.

7. The flat monitor panel according to claim 6, wherein the panel further comprises:

a second coating layer formed by coating the coating layer of claim 6 with a second coating composition for forming the second coating layer comprising a metallic alkoxide or an oligomer thereof on the coating layer.

8. The flat monitor panel according to claim 7, wherein the metallic alkoxide of the second coating layer is represented by the following Formula (2):

$$M(OR')_4 \quad (2)$$

wherein

M is one element selected from the group consisting of Si, Ti, Sn, and Zr; and

R' is a $C_{1-4}$ alkyl group.

9. The flat monitor panel according to claim 7, wherein the oligomer of the metallic alkoxide of the second coating layer has a degree of polymerization of between 2 and 10.

10. The flat monitor panel according to claim 6, wherein the panel further comprises:

a second coating layer formed by coating the coating layer of claim 6 with a second coating composition for forming the second coating layer comprising a metallic alkoxide or an oligomer thereof, a coloring agent, a silane coupling agent, and a solvent on the coating layer.

11. The flat monitor panel according to claim 10, wherein the content of the metallic oxide or oligomer thereof is between 0.01 and 10% based on the total solid content of the second composition for forming the second coating layer.

12. The flat monitor panel according to claim 10, wherein the content of the coloring agent is between 0.01 and 5% based on the total solid content of the second composition for forming the second coating layer.

13. The flat monitor panel according to claim 10, wherein the content of the silane coupling agent is between 0.01 and 70% based on the solid content of the metallic alkoxide.

14. The flat monitor panel according to claim 6, wherein the panel further comprises:

a second coating layer formed by coating the first coating layer with a second composition comprising a metallic alkoxide or an oligomer thereof; and a third coating layer formed by spray-coating the second coating layer with a hydrolysate comprising a metallic alkoxide or an oligomer thereof.

15. The flat monitor panel according to claim 14, wherein the metallic alkoxide of the second coating layer is represented by the following Formula (2):

$$M(OR')_4 \quad (2)$$

wherein

M is one element selected from the group consisting of Si, Ti, Sn, and Zr; and

R' is a $C_{1-4}$ alkyl group.

16. The flat monitor panel according to claim 14, wherein the oligomer of the metallic alkoxide has a degree of polymerization of between 2 and 10 .

17. A flat monitor panel for a display device, comprising:

a first coating layer formed by coating the outer surface of a flat monitor panel with a first composition comprising a conductive particulate; and a second coating layer formed by coating the first coating layer with a second composition for forming the second coating layer comprising a metallic oxide particulate, a coloring agent, and a silane coupling agent, wherein the silane coupling agent is represented by the following Formula (1):

$$YRSiX_3 \quad (1)$$

wherein

Y is an organic functional group selected from the group consisting of a vinyl groups, phenyl groups, and mercapto groups, and is reactive with an organic material;

R is an alkyl group; and

X is an alkoxy group that is reactive with an inorganic material.

18. The flat monitor panel according to claim 17, wherein the panel further comprises:

a third coating layer formed by spray-coating the second coating layer with a hydrolysate comprising a metallic alkoxide or an oligomer thereof.

* * * * *

UNITED STATES PATENT AND TRADEMARK OFFICE

CERTIFICATE OF CORRECTION

PATENT NO. : 7,132,169 B2
APPLICATION NO. : 10/238743
DATED : November 7, 2006
INVENTOR(S) : Lee et al.

It is certified that error appears in the above-identified patent and that said Letters Patent is hereby corrected as shown below:

On the Title Page

| | |
|---|---|
| (56) References Cited U.S. Patent Documents 6,642,647... | Delete "B1", Insert --B2-- |
| (56) References Cited U.S. Patent Documents 6,771,017... | Delete "B1", Insert --B2-- |

In the Claims

| | |
|---|---|
| Column 9, line 65, Claim 1 | Delete "a vinyl groups", Insert --vinyl groups-- |
| Column 10, line 14, Claim 4 | Delete "(TiG)", Insert --(TiO)-- |
| Column 10, line 33, Claim 5 | Delete "a vinyl groups", Insert --vinyl groups-- |
| Column 10, line 52, Claim 6 | Delete "a vinyl groups", Insert --vinyl groups-- |
| Column 12, line 12, Claim 15 | Delete "10 .", Insert --10.-- |

UNITED STATES PATENT AND TRADEMARK OFFICE

CERTIFICATE OF CORRECTION

PATENT NO. : 7,132,169 B2
APPLICATION NO. : 10/238743
DATED : November 7, 2006
INVENTOR(S) : Lee et al.

It is certified that error appears in the above-identified patent and that said Letters Patent is hereby corrected as shown below:

In the Claims (cont'd)

Column 12, line 27, Claim 17 Delete "a vinyl groups",
Insert --vinyl groups--

Signed and Sealed this

Twenty-eighth Day of August, 2007

JON W. DUDAS
*Director of the United States Patent and Trademark Office*